United States Patent [19]

Hamabe et al.

[11] 4,434,452

[45] Feb. 28, 1984

[54] METALLIZED FILM CAPACITOR

[75] Inventors: Takeshi Hamabe, Nishinomiya; Hidekazu Wada, Takaoka; Mikio Naruse, Takaoka; Toshiyuki Nishimori, Takaoka, all of Japan

[73] Assignee: Matsushita Electric Industrial Co., Ltd., Kadoma, Japan

[21] Appl. No.: 225,440

[22] Filed: Jan. 15, 1981

[30] Foreign Application Priority Data

Jan. 18, 1980 [JP] Japan .................................. 55-4871

[51] Int. Cl.$^3$ ...................... H01G 1/015; H01G 1/14; H01G 1/17; H01G 7/00
[52] U.S. Cl. .................. 361/304; 29/25.42; 361/273; 361/309
[58] Field of Search ............... 361/273, 274, 275, 304, 361/308, 309, 314; 29/25.42

[56] References Cited

U.S. PATENT DOCUMENTS

| | | | |
|---|---|---|---|
| 2,216,558 | 10/1940 | Ortlieb | 361/275 |
| 2,216,559 | 10/1940 | Ortlieb | 361/275 X |
| 3,298,864 | 1/1967 | Maylandt | 361/275 X |
| 3,303,550 | 2/1967 | Banzhof | 361/308 X |
| 3,419,770 | 12/1968 | Tomago | 361/273 X |
| 3,513,368 | 5/1970 | Boyer | 361/275 |
| 3,585,467 | 6/1971 | Linzox | 361/314 |
| 4,215,385 | 7/1980 | Bohn | 361/273 |

FOREIGN PATENT DOCUMENTS 1036996 7/1966 United Kingdom ................ 361/309

Primary Examiner—Donald A. Griffin
Attorney, Agent, or Firm—Cushman, Darby & Cushman

[57] ABSTRACT

A disclosed metallized film capacitor comprises a number of first insulating foil film segments coated with metal electrode layers on at least each one surface thereof, the metal electrode layers with a same pattern on same sides of the first insulating foil film segments constituting a first electrode segment group, and the metal electrode layers with another same pattern on same sides of the first insulating foil film segments constituting a second electrode segment group, and a first and a second metal contact layers respectively disposed in contact with the first and the second electrode segment groups at side edges thereof, and the capacitor is provided with fusing proof function for the purpose of prevention of emitting smoke from and/or burning of the capacitor, which is improved by features that the metal electrode layers comprises previously-processed portions at side edges thereof adjacent the first and the second metal contact layers, and that the previously-processed portions are electrically cut off, when dielectric breakdown occurs between respective pairs of confronting metal electrode layers, which dielectric breakdown makes at least one metal electrode layer of one pair among the respective pairs of the confronting metal electrode layers electrically separate from the first and the second electrode segment groups.

12 Claims, 21 Drawing Figures

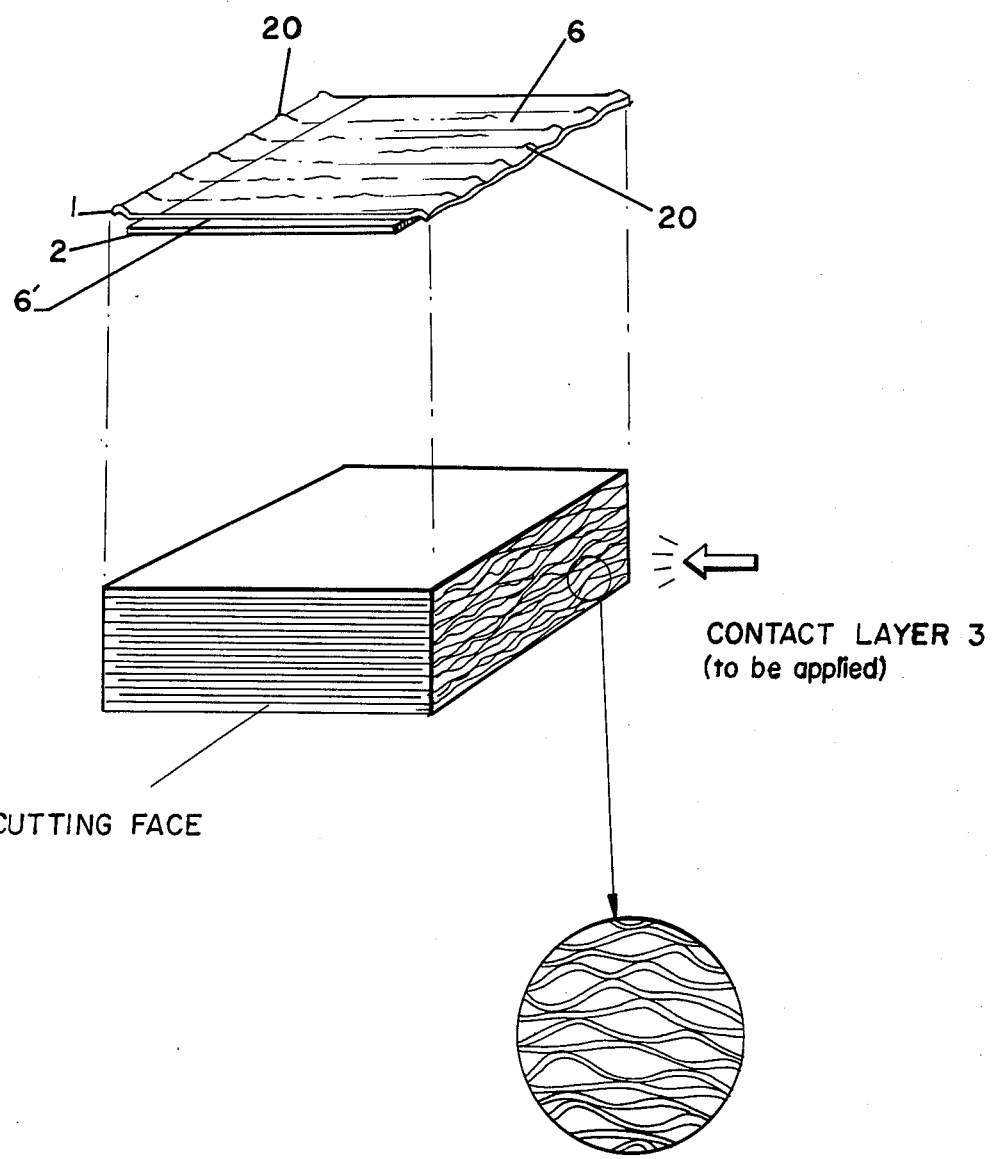

METALLIZED FILM CAPACITOR

BACKGROUND OF THE INVENTION

1. Field of the Invention

The present invention relates to metallized film capacitors which are improved by comprising a number of separate electrode segments made of evaporated metal film provided with fusing proof function.

2. Prior Arts

Conventional AC capacitors grouped into metallized film capacitors have structures that metallized roll films are rolled to a drum or a flat shape. FIG. 1 is a perspective view of a conventional winding type capacitor. FIG. 2 is an enlarged elevation view of one constitutional segment used for the capacitor of FIG. 1. A roll foil 1 coated with evaporated metal films 6 and 6' on both surfaces thereof is placed adjacent another roll foil 2 serving as an insulation film. Both foils 1 and 2 are than rolled into a drum shape or a non-circular shape as shown in FIG. 1.

Metal spray is applied to the side faces of the rolled electrode layers thus forming electrode lead-out portions 3. External lead wires are soldered to the metal-sprayed side faces 3.

When such rolled capacitors are used for long hours, or they are subject under a high temperature condition, thermal characteristics of the insulative foils 1 and 2 are gradually degraded. Thus, self-healings defined as below occasionally occur. The self-healing is a phenomenon that when dielectric breakdown of the foils occurs locally, the breakdown places are healed, i.e. insulation of the capacitors is soon restored by flowing off the metal film portions around the short-circuited foil films. The increase of self-healing times resultantly leads to an increase of a loss angle tan δ, thereby increasing consuming electric energy. This energy increase triggers detachment of the sprayed metal contact layers from the evaporated metal electrode layers. And in worst cases, the sprayed metal contact layers can not maintain sufficient electric contact with the evaporated metal electrode layers, and dielectric breakdown exceeding the limit of the self-healing is triggered ultimately. At the last stage, the metallized film capacitors may emit smoke, or sometimes they are burned.

In order to avert such fuming or burning of the capacitors, the conventional capacitors are provided with some kinds of proof means, for example temperature fuse, current fuse, etc. The provision of such proof means in the casing of the capacitors increases their production costs.

The reason of the production of fire can be explained as the following way. Since the electrode layers are formed long on the long rolled single foil, and besides since the sprayed metal contact layers are in contact with the electrode layers in length, excessive current can flow through well-preserved current paths until the fire production, when self-healing is not sufficient, thereby leading to generation of badly insulated places.

SUMMARY OF THE INVENTION

The present invention provides metallized film capacitors comprising a number of separated metal film electrode segments, and are provided with protection function to avert abnormal phenomena liable to fuming and/or the production of fire. This protection function can be obtained, since separated metal film electrode segments serve as fuse means when excessive current flows.

BRIEF DESCRIPTION OF THE DRAWINGS

FIG. 4A is an enlarged perspective view illustrating protrusions formed on a film capacitor.

DESCRIPTION OF THE PREFERRED EMBODIMENTS

The present invention provides a metallized film capacitor comprising a number of first insulating foil film segments coated with metal layers on at least each one surface thereof, said metal layers with a same pattern on same sides of said first insulating foil film segments constituting a first electrode segment group, and said metal layers with another same pattern on same sides of said first insulating foil film segments constituting a second electrode segment group, and a first and a second metal contact layers respectively disposed in contact with said first and said second electrode segment groups at side edges thereof.

Figure 1:
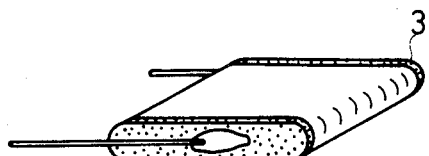
FIG. 1 is a perspective view of a conventional winding type capacitor.
Figure 2:
FIG. 2 is an enlarged elevational view of one constitutional segment used for the capacitor of FIG. 1.
Figure 3:
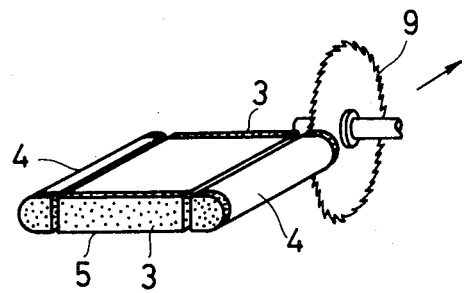
FIG. 3 is a perspective view schematically illustrating one production step to obtain metallized film capacitors embodying the present invention.

FIG. 3 is a perspective view schematically illustrating one production step to obtain metallized film capacitors embodying the present invention. A structure same as the conventional metallized film capacitor shown in FIG. 1 is used as a starting device. Two corner sides 4 are cut away by a milling cutter 9 to obtain a film capacitor 5 comprising a number of insulating foil film segments which are coated with metal layers on both sides thereof and are insulated from each other by a number of another insulating foil film segments disposed in-between in a stacked form. Another two side faces of the film capacitor 5 are coated with sprayed metal layers 3.

Figure 4:
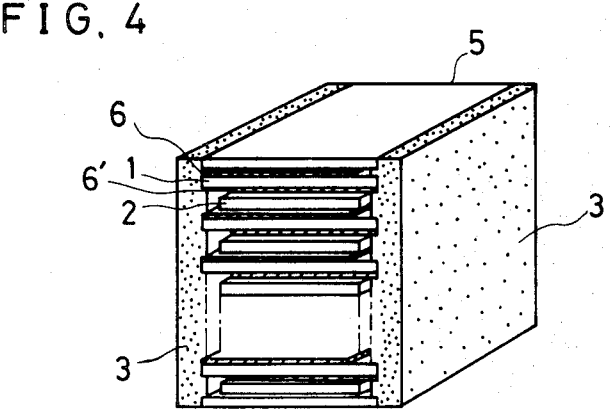
FIG. 4 is an enlarged perspective view showing a structure of a metallized film capacitor of a first example embodying the present invention.

FIG. 4 is an enlarged perspective view showing a structure of the film capacitor 5. Since the film capacitor 5 comprises a number of segment electrodes, which are separated from each other, it is much more important to bring the sprayed metal layers 3 into sufficient contact with evaporated metal layers 6 and 6' than the case of the conventional film capacitors. In the conventional case, even when the sprayed metal layers 3 are partly not in good contact with the evaporated metal film layers 6 and 6', other portions in good contact with the film layers 6 and 6' can compensate poorly-contacting places without loss of electric characteristics. On the other hand, in the present case, if the sprayed metal layers 3 poorly contact one segment electrode at most parts of the contacting places along one segment electrode, the poor contacting can not be compensated by other segment electrodes. When the sprayed metal layers 3 poorly contact the segment electrode, there arises a possibility that contact of the sprayed metal layers 3 with the electrode segments 6 and 6' is lost with such low electric energy as $10^{-5}$ to $10^{-4}$ Joule and that capacitance decrease is expected.

This problem can be solved by a measure by employing the foil film coated with evaporated metal films provided with a number of protrusions of 20–70 μm in height. They are protruded in the thick-wise direction and lined up at intervals of e.g. 2.5 mm along the side edges. FIG. 4A is an enlarged perspective view illustrating protrusions formed on a film capacitor. A number of protrusions 20 are produced at the evaporated metal films 6 and 6' and the foil film 1 along their side edges. The provision of the protrusions makes widen the gap spaces between foil film segments, and thus the sprayed metal can easily get in contact with the evaporated metal layers. Accordingly, it is possible to obtain contact strength endurable against electric energy in the order of $10^{-3}$ J. Such contact strength is sufficient in practical use.

This fact is verified by several experiments in measuring electric energy when self-healing occurs, while applying AC voltage of 200–250 V at 70° C. for 1000 hours across lead wires of a metallized film capacitor constituted by a number of foil film segments of 5–6 μm in thickness. The measured electric energy values widely ranges between $10^{-4}$ to $10^{-2}$ J, but most of them lie within $10^{-4}$–$10^{-3}$ J. Accordingly, in practical use of such capacitors provided with protrusions at the side edges of the metallized foil film segments are almost free from the capacitance decrease arising from insufficient contact strength.

The metallized film cpacitors embodying the present invention are featured in that cut-off path phenomena are observed under abnormal states, when self-healing is repeatedly occurred by high electric energy liable to lead to insulation degradation and/or when dielectric breakdown occurs and self-healing can be no more expected. In other words, the metallized film capacitors are provided with fuse means in their structures. The present invention will be described in detail in the following by referring to the accompanied drawings.

(I) Embodiment 1

FIG. 4 is an enlarged perspective view showing a structure of a metallized film capacitor of a first example embodying the present invention. A metallized film capacitor 5 comprises a number of foil films 1 coated with evaporated metal layers 6 and 6' on both sides thereof, and a number of insulation foil films 2. The foil films 1 are polyethylene terephthalate films of 6 μm in thickness and are coated with vacuum-evaporated Al films 6 and 6'. The insulation foil films 2 are polypropylene films provided with a number of protrusions (not shown) of 30–50 μm in height. The protrusions are protruding in the thick-wise direction and lining up along the side edges for establishing strong contact of sprayed metal layers 3 with the evaporated film layers 6 and 6'. In this case, the metallized film capacitor 5 is obtained by cutting a conventional metallized film capacitor (as shown in FIG. 1) with single group of continuous foil films wound by 700 times. Therefore, the metallized film capacitor 5 comprises 700 pairs of the separated electrode segments.

Figure 5:
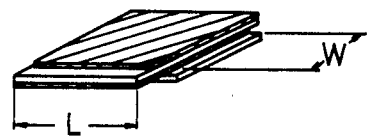
FIG. 5 is a perspective view illustrating dimensions of electrode segments of the metallized film capacitor shown in FIG. 4.

The electrode segment dimension (W × L) is 26 mm × 26 mm as shown in FIG. 5. The width W corresponds to an overlapping length where two confronting electrode segment pairs confront with each other. The obtainable capacitance of the metallized film capacitor 5 is 3 μF. Lead wires are soldered to the sprayed metal layers 3, and then the metallized film capacitor 5 is encased in a resin casing, followed by cast molding of epoxy resin. Then, proof tests were carried out by using the conventional film capacitor and the metallized film capacitor embodying the present invention for making a comparison between them.

Figure 6:
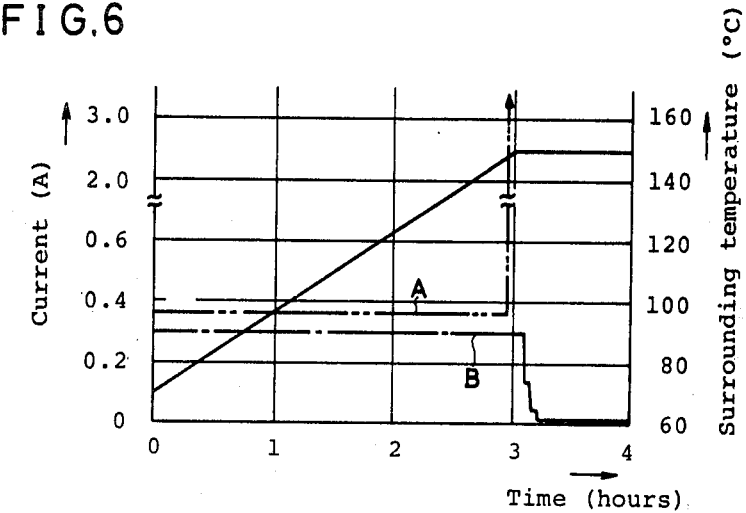
FIG. 6 is a graph showing electrical characteristic differences between two capacitors of conventional type and the present invention.

FIG. 6 is a graph showing electrical characteristic differences between two kinds of the metallized film capacitors. The tests were made by applying an AC voltage of 250 V and bringing about dielectric breakdown by force with atmospheric temperature increase from 70° C. to 150° C. The testing items included whether the capacitors emit smoke at the time of the forced dielectric breakdown. Curve A and curve B correspond to the test results for the conventional capacitor and the capacitor embodying the present invention, respectively. The current flowing through the conventional capacitor (curve A) suddenly increased around at 150° C., and then the capacitor emitted smoke. On the contrary, the current flowing through the capacitor embodying the present invention suddenly decreased to almost null, and the capacitor did not emit smoke at all. This result reflects the fact that electrode segments were successively cut off when the dielectric foil layers successively caused thermal breakdown giving rise to dielectric breakdown.

Figure 7:
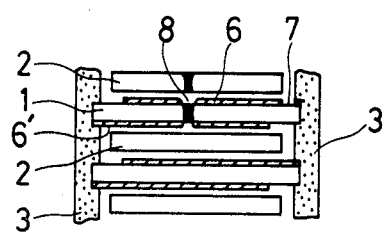
FIG. 7 is an elevation view showing cut-off places of the metallized film capacitor of FIG. 4.
Figure 8:
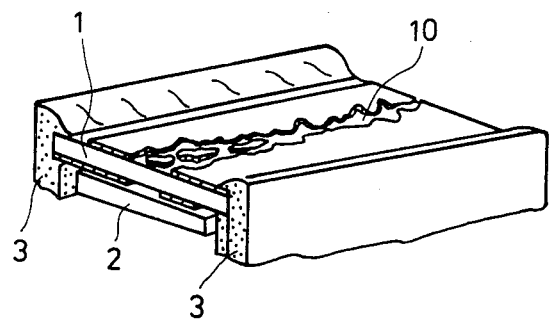
FIG. 8 is a perspective view showing a cut-off path formed by continuously-repeated self-healing.

After the breakdown tests described above, the metallized film capacitor embodying the present invention was decomposed in order to examine the cut-off places on the electrode segments. FIG. 7 is an elevation view showing the metallized film capacitor of the present invention after the breakdown tests. An electrode segment 6 was cut off at a cut-off place 7. A metallized foil film 1 and an insulating foil film 2 were damaged to produce a dielectric breakdown place 8. FIG. 8 is a perspective view showing one representative pair of the electrode segments from the capacitor of FIG. 7. An electrode segment on a metallized foil film 1 was cut off thereby producing a successively self-healed path 10. Such a successively self-healed path is formed in a length-wise direction of the electrode segment when the self-healing repeatedly and successively occurs on the same electrode segment.

Visual inspection tests of a number of the decomposed electrode segments revealed the following results. About 90% of the electrode segments were cut off as shown in FIG. 7. That is, the electrode segments have cut-off places 7 at the side ends thereof. The side ends correspond to portions extending outward from the side edge of the insulating foil film 2. The remaining 10% of the electrode segments were destroyed thereby producing the successively self-healed paths 10 as shown in FIG. 8. The fact that such successively self-healed paths 10 are formed at the central parts of the electrode segments 6 and 6' indicates the situation that, although the capacitor does not emit smoke nor generate fire, a number of self-healed places are produced instantly on one plane thus giving rise to a risky possibility of emitting smoke due to large heat generation. This contrasts to the case of cut-off places 7 formed at the end sides of the electrode segments 6 and 6'.

Accordingly, in order to more improve the reliability of fusing function of the segment electrodes, it is preferable to employ a device structure that the cut-off paths are surely formed at the end sides of the electrode segments 6 and 6' and along the sprayed metal layers 3, while averting the forming of the successively self-healed paths at the central parts of the electrode segments. The following measure is employed for ensuring such preferable cut-off.

(II) Embodiment 2

Figure 9:
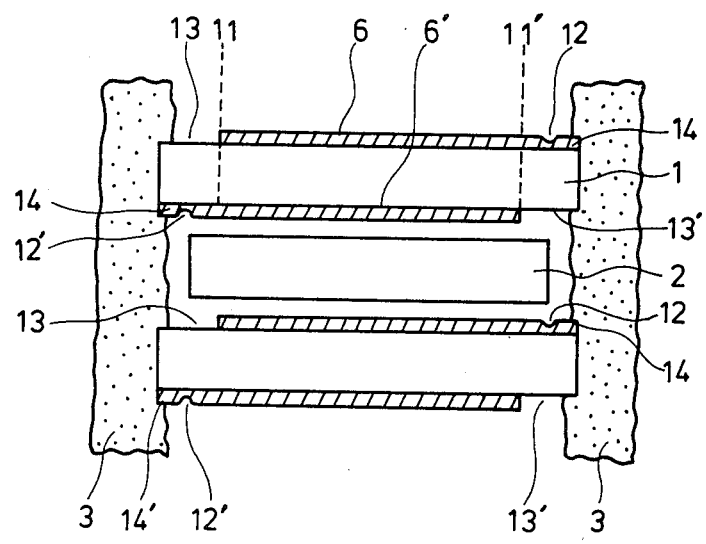
FIG. 9 is an enlarged elevation view showing an electrode structure employed in a metallized film capacitor of a second example embodying the present invention.

FIG. 9 is an enlarged elevation view showing an electrode structure employed in a metallized film capacitor of a second example embodying the present invention. Metallized polyethylene terephthalate foil films 1 of 6 μm in thickness are coated with evaporated Al metal layers 6 and 6'. Insulating polypropylene foil films 2 of 6 μm in thickness are interposed between the metallized foil films 1. The metallized film capacitor comprises 700 pairs of foil films 1 and 2 in a stacked form, obtainable in a manner similar to the process illustrated in FIG. 3. The film capacitor has a capacitance of 3 μF and encased in a casing by casting mold using epoxy resin. The metal layers 6 and 6' are evaporated on both faces of the foil films 1 to have higher resistive portions 12 and 12', which are partly formed in a stripe shape or a belt shape along the sprayed metal layers 3 and at places on the evaporated metal layers 6 (and 6') corresponding to evaporation margin portions 13' (and 13) of the oppositely lying metal layers 6' (and 6). The provision of such partly higher resistive portions ensures the production of the cut-off paths at the end sides of the electrode segments 6 and 6'. The evaporation of the metal layers 6 and 6' was made in such a manner that about 0.4 mm wide portions of the evaporated metal layers 6 and 6' have a thinner film thickness by positioning a suitable mask above the portions.

Resistances of the normal thick metal layer portions were 2–3.5 (Ω/square), whereas higher resistances of the thinner metal layer portions were 5–20 (Ω/square). The higher resistive portions 12 (and 12') were formed to lie at places on the metal layers 6 (and 6') confronting with places almost in the middle of the evaporation margin portions 13' (and 13) of the opposite side of the foil films 1. The evaporation margin portions 13 (and 13') are defined by edge portions extending outwards from dotted lines 11 (and 11'). Edge portions 14 (and 14') of the evaporated metal films 6 (and 6') are formed on the foil films provided with a number of protrusions at the edges thereof, similar to the case of example 1.

Proof function tests were made by causing dielectric breakdown within about 30 minutes after applying an AC voltage of 400 V at a surrounding temperature of 120° C., followed by visual inspection tests. The visual inspection tests included inspection whether the metallized film capacitor emits smoke and are burnt, and inspection how and where cut-off paths were formed, by decomposing the metallized film capacitor after the dielectric breakdown. The test results revealed that the capacitor did not emit smoke nor generate fire, and besides that all of the cut-off paths were generated at the higher resistive portions of the electrode segments. No cut-off paths were produced like the successively self-healed paths 8 as shown in FIG. 8 formed at the center portions of the electrode segments.

(III) Embodiment 3

Figure 10:
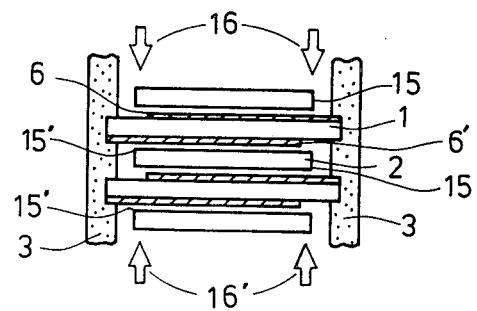
FIG. 10 is an elevation view schematically showing electrode structure employed in a metallized film capacitor of a third example embodying the present invention.
Figure 11:
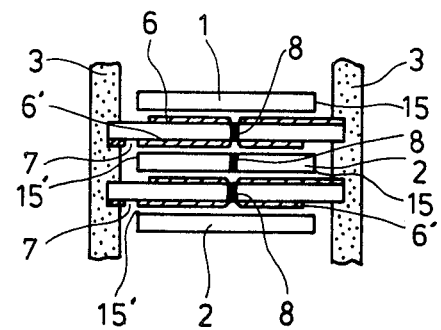
FIG. 11 is a cross-sectional view showing cut-off places of the metallized film capacitor of FIG. 10.

It is further possible to produce cut-off paths at the side edges of the metallized film segments, when dielectric breakdown occurs, in the following way. FIG. 10 is an elevation view schematically showing electrode structure employed in a metallized film capacitor of a third example embodying the present invention. Cut-off paths can be produced with the metallized film capacitor, which was processed before use, by pressing side edges 15 and 15' of insulating foil film segments 2 in directions indicated by arrows 16 and 16'. FIG. 11 is a cross-sectional view showing cut-off places 7 of the metallized film capacitor of FIG. 10. When the metallized film capacitor caused dielectric breakdown at places 8 as shown in the drawing and large current flowed through the metal film segments 6 and 6', they are cut at side portions above the side edges 15' of the insulating film segments 2, as shown in FIG. 11.

Figure 12:
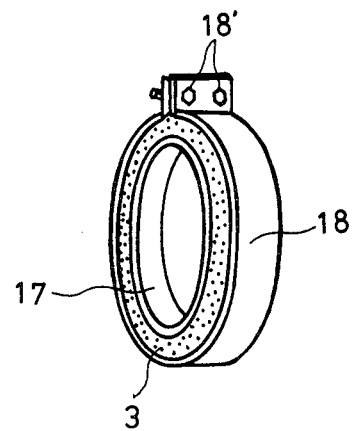
FIG. 12 is a perspective view showing ring-shaped capacitor segment body.

The abovementioned pressing was made in the following way. FIG. 12 is a perspective view showing ring-shaped capacitor segment body. The ring-shaped capacitor segment body was made by winding a polyethylene terephthalate film coated with Al-evaporated films on both faces thereof, together with a polypropylene film. The metallized film is 6 μm in thickness and 42 mm in width, and is provided with a number of protrusions at the side edges thereof. The polypropylene film is 6 μm in thickness and 40 mm in width. The films were wound around an iron bobbin 17 of 200 mm in diameter by 1300 turns. Metal spray of Zn was applied to both side faces of the wound capacitor segment body thereby forming sprayed metal layers 3. A metal band 18 was employed to press the wound capacitor segment body by bolts 18' for the purpose of pressing the side edges of the polypropylene film. After pressing the wound capacitor segment body with a specified pressure, the pressing condition was maintained for 10 to 15 hours at 100°–130° C. Thereafter, the wound capacitor segment body was cut into many pieces e.g. 25 pieces to obtain metallized film capacitor segments. Proof function tests were carried out by using the metallized film capacitor segments of 6 μF in a similar manner to the case of Embodiment 2. The visual inspection test results revealed that all of the cut-off paths were generated near the side edges of the evaporated metal layers as shown in FIG. 11, when the pressure of pressing the stacked foil layers at room temperature exceeds 5 Kg/cm$^2$. No cut-off paths were produced like the successively self-healed paths 8 as shown in FIG. 8 formed at the central portions of the electrode segments.

(IV) Embodiment 4

Figure 13:
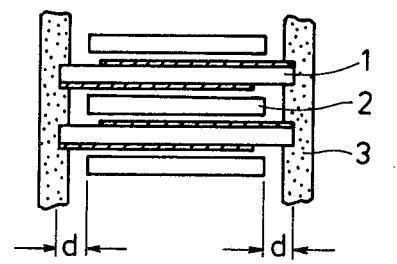
FIG. 13 is an elevation view showing an electrode structure employed in a metallized film capacitor of a fourth example embodying the present invention.

It is further possible to improve the proof function obtained in Embodiment 3 by shortening a width difference between two pairs of the foil film segments. FIG. 13 is an elevation view showing an electrode structure employed in a metallized film capacitor of a fourth example embodying the present invention. A width difference "d" was 0.6–1.0 mm in the case of Embodiment 3. The shorter the width difference, the more the proof function is improved. This is because electric energy to cause cut-off paths, when dielectric breakdown occurs, becomes smaller for a smaller width difference thus producing cut-off paths more easily. In comparison with several metallized film capacitors having differnet width differences, proof function tests were carried out similarly to the case of Embodiment 2. Destroyed places were examined after decomposition of the metallized film capacitors. Average area sizes of the destroyed places were measured and tabled in Table 1 below.

TABLE 1

| Width difference d (mm) | Average area size (mm) in diameter of destroyed places |
| --- | --- |
| 0.2 | 1.5 |
| 0.4 | 2.5 |
| 0.6 | 3.0 |
| 1.0 | 5.0 |

The tested capacitors comprised a number of electrode film segments of 26 mm×20 mm. The destroyed places were produced by dielectric breakdown of the foil film segments, and they are usually formed at central portions thereof. Table 1 shows that the smaller the width difference "d", the smaller the average area size becomes. The film capacitors with larger average area size of the damaged foil film segments allowed the flowing of large current for a longer time. The flowing times ranged from 0.2 to 1.0 sec for the film capacitors for the test results listed in Table 1.

(V) Embodiment 5

Figure 14:
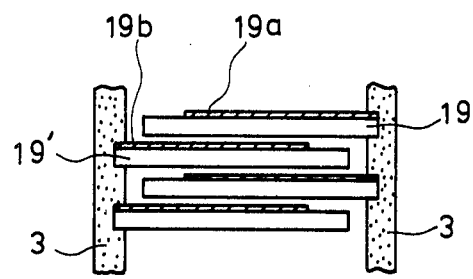
FIG. 14 is an elevation view of a metallized film capacitor of a fifth example embodying the present invention.

FIG. 14 is an elevation view of a metallized film capacitor of a fifth example embodying the present invention. A pair of polyethylene terephthalate foil films 19 and 19' of 6 μm in thickness and 42 mm in width respectively coated with evaporated Al films 19a and 19b on their respective one faces, were overlapped with a horizontal displacement of 1 mm, and then wound around a bobbin by 1300 turns in a similar manner to the case of Embodiment 3. Pairs of foil film segments 19 and 19' were once pressed by a pressure of 15 Kg/cm$^2$ at a room temperature and continuously pressed at a heating temperature of 120° C. for 12 hours. One chip of the metallized film capacitors of 6 μF was encased in a casing and sealed by epoxy resin. Proof function tests were carred out by causing dielectric breakdown within a specified time after applying an AC voltage of 350 V at a surrounding temperature of 85° C. The testing items included whether the film capacitors emitted smoke and/or burnt at the time of the forced dielectric breakdown. They did not emit smoke at all, nor generate fire. Visual inspection results revealed that produced cut-off paths were ideal cut-off paths at the side edges of the metal electrode segments.

(VI) Embodiment 6

A number of metallized film capacitors were produced to have a width W of 26 mm (like the case of Embodiment 1) and a width W of 36 mm. A length L of the capacitors is varied from 26 mm to about 83 mm. In comparison with the metallized film capacitors with several different ratio values (L/W), proof function tests were carried out for them. Testing results are summarized in Table 2 below. It is to be noted that the ratio (L/W) should be smaller than 2.0 in order to provide fusing proof function.

TABLE 2

| | Inspection results whether capacitors emitted smoke | |
| --- | --- | --- |
| L/W | W = 26 mm | W = 36 mm |
| 1.0 | none | none |
| 1.5 | none | none |
| 2.0 | none | none |
| 2.1 | smoke emission | smoke emission |
| 2.2 | " | " |
| 2.3 | " | " |

(VII) Embodiment 7

Figure 15:
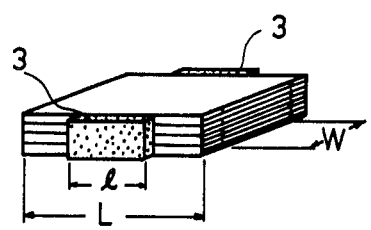
FIG. 15 is a perspective view of a metallized film capacitor of a sixth example embodying the present invention.

A number of metallized film capacitors were prepared in order to study a relationship between a width of confronting electrode segments and a length of sprayed metal layers. This study purported to improve the proof function of the capacitors which have ratio values (L/W) larger than 2.1 in the case of Embodiment 6. FIG. 15 is a perspective view of a metallized film capacitor of a sixth example embodying the present invention. The metallized film capacitors were provided with sprayed metal layers 3 of a length "l" shorter than a length "L" of the electrode segments. Such shorter sprayed metal layers 3 can be formed by using suitable masking means at the metal spraying. Similar proof function tests were also made for them. Test results are summarized in Table 3 below. The test results revealed that it was also obtainable fusing proof function for the metallized film capacitors with (L/W) values larger than 2.1. Such metallized film capacitors are suitable for obtaining a large capacitance.

TABLE 3

| L/W | l/W | Inspection results whether capacitors emitted smoke |
| --- | --- | --- |
| 2.5 | 1.5 | none |
| | 2.0 | none |
| | 2.1 | smoke emission |
| | 2.2 | " |
| 3.0 | 1.5 | none |
| | 2.0 | none |
| | 2.1 | smoke emission |
| | 2.2 | " |

In the following, brief descriptions are given as regards resistances of the metal electrode segments. Resistance measurement results revealed that preferable resistances for the fusing proof function diesclosed in the present application were between 1.5 (Ω/square) and 8.0 (Ω/square). It was also revealed that most of (e.g. 18 or 19 chips among 20 samples) the metallized film capacitors with metal electrode segments of resistance smaller than 1.5 (Ω/square) had similar proof function. On the other hand, metallized film capacitors with metal electrode segment resistances higher than 8 (Ω/square), in other words, metallized film capacitors with thinner electrode segment films, showed similar proof function, but the sprayed metal layers can not maintain contact with the thinner electrode segment films. The thinner the electrode segment films are, the more easily they are melted with heat. Therefore, such capacitors showed adverse electrical characteristics that their loss angle tan δ became higher, that the fusing proof function occurred with low electrical energy, and that charging and discharging operation became worse.

Figure 16:
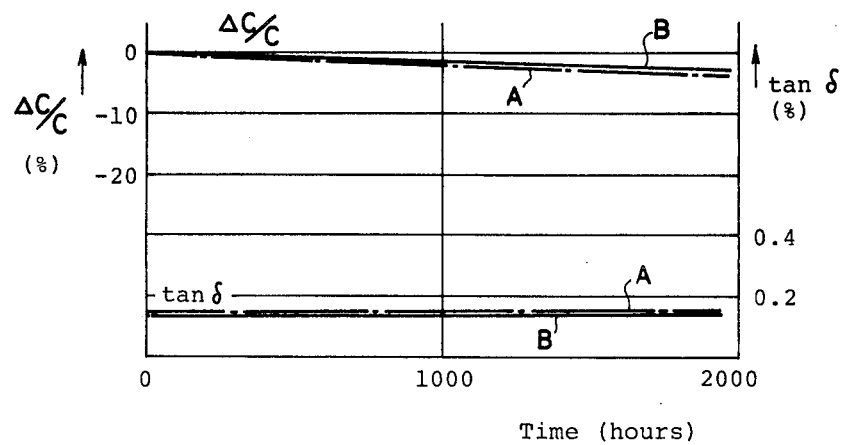
FIG. 16 is a graph showing life test results measured with a conventional capacitor and a metallized film capacitor embodying the present invention.

FIG. 16 is a graph showing life test results measured with conventional capacitors and metallized film capacitors embodying the present invention. The capacitors with L/W (=l/W) values being 1 were tested under a condition of applying an AC voltage of 250 V at 70° C., in order to measure capacitance changes (ΔC/C) and loss angles (tan δ). It was found that the metallized film capacitors embodying the present invention with the fusing proof function were as superior as the conventional metallized film capacitors without the fusing proof function as disclosed here.

As modified examples, it is further possible to employ other materials for the foil films. For example, polypropylene films and polycarbonate films can be used, instead of the polyethylene terephthalate films, for the metallized foil films. For the insulating foil films used together with the metallized foil films coated with metal coating layers on both faces thereof, polyethylene terephthalate films and polycarbonate films can be used other than the polypropylene films. These alternatives are possible for the metallized foil film coated with metal coating layers on each one face thereof.

There are other modified examples as regards structures or arrangement of the metal electrode segments, as shown in FIGS. 17(a)-17(d). A pair of metallized film capacitors in FIG. 17(a) can be obtained by separating one wound type film capacitor. The cutting separation is made in a direction perpendicular to the sprayed metal faces. A metallized film capacitor in FIG. 17(b) with a pair of separated sprayed metal layers 3' and 3" and a common sprayed metal layer 3, is obtained by cutting and separating a number of metal electrode layers with margin portions of the metallized foil films unseparated. The capacitor has a structure equivalent to that two separated capacitors are interconnected in series.

Figure 17A:
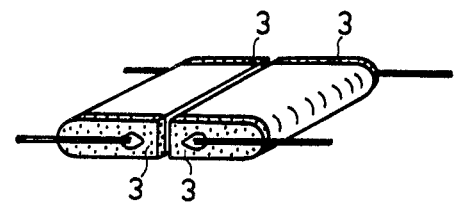
FIGS. 17(a) to 17(d) are perspective views showing several other modified embodiments.
Figure 17B:
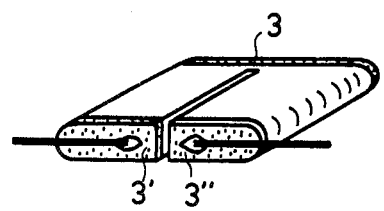
Figure 17C:
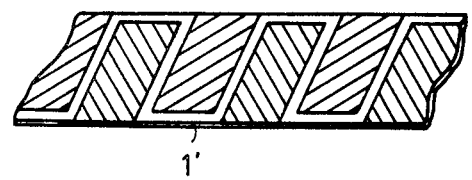
Figure 17D:
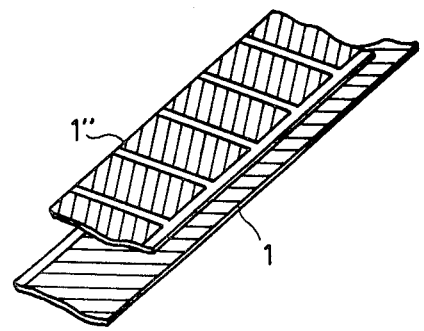

FIG. 17(c) is a perspective view showing a metallized foil film 1' coated with a number of metal electrode segments on one face thereof with a comb pattern shown in the drawing. The metallized foil film 1' is wound by a number of turns to obtain a metallized film capacitor with fusing proof function embodying the present invention. FIG. 17(d) is another perspective view showing a metallized foil film 1" coated with a number of metal electrode segments on one face thereof with a partition pattern. The metallized foil film 1" is wound together with another metallized foil film 1 uniformly coated with a metal electrode layer. The winding of a number of turns produces a metallized film capacitor with fusing proof function embodying the present invention. In the case of FIG. 17(d), it is also possible to employ a pair of metallized foil films with coating patterns like that of the metallized foil film 1" to obtain a metallized film capacitor embodying the present invention.

In conclusion, in using the metallized film capacitors embodying the present invention, there is no need to employ additional proof means. Therefore, it is possible to minituarize the size of the capacitors. The capacitors thus have significant advantages in technical and economical points of view.

What is claimed is:

1. A metallized film capacitor comprising:
   a number of first insulating foil film segments coated with metal layers on both surfaces thereof, said metal layers with a same pattern on same sides of said first insulating foil film segments constituting a first group of electrode segments electrically separated from each other, and said metal layers with another same pattern on the other sides of said same sides of said first insulating foil film segments constituting a second group of electrode segments electrically separated from each other,
   a number of second insulating foil film segments, each one thereof being disposed between each one of said first insulating foil film segments in a stacked form, and
   a first and a second metal contact layers respectively disposed in contact with said first and second electrode segment groups at side edges thereof forming a first fusing portion at said side edges,
   said metal electrode layers each including a second fusing portion formed as an integral fusing portion extending along and adjacent and substantially parallel to said first and said second metal contact layers,
   said first fusing portion and said second fusing portion forming a series connection with each other, and
   at least one of said first fusing portion and said second fusing portion being electrically cut off, when dielectric breakdown occurs between respective pairs of confronting metal electrodes layers on said first insulating foil film segments, such that the breakdown electrically separates at least one metal electrode layer of one pair among said respective pairs of the confronting metal electrode layers from the respective electrode segment group among said first and said second electrode segment groups.

2. A metallized film capacitor comprising:
   a number of first insulating foil film segments coated with first metal layers on each one surface and on same sides thereof, said first metal layers with a first same pattern on the same sides of said first insulating foil film segments constituting a first electrode segment group,
   a number of second insulating foil film segments disposed alternatively between said first insulating foil film segments in a stacked form, and coated with second metal layers on each one surface and one same sides,
   said second metal layers with a second same pattern on the same sides of said second insulating foil film segments constituting a second insulating foil film segments constituting a second electrode segment group in such a manner that said first and second metal layers are insulated from each other respectively by said first and said second insulating foil film segments, and
   first and second metal contact layers respectively disposed in contact with said first and said second electrode segment groups at side edges thereof forming a first fusing portion at said side edges,
   said metal electrode layers each including a second fusing portion formed as an integral fusing portion extending along and adjacent and substantially parallel to said first and second metal contact layers, said first fusing portion and said second fusing portion forming a series connection with each other, and at least one of said first fusing portion and second fusing portion being electrically cut off, when dielectric breakdown occurs between respective pairs of confronting metal electrode layers on said first and said second insulating foil film segments, and the breakdown electrically separating at least one metal electrode layer of one pair among said respective pairs of the confronting metal electrode layers from the respective electrode segment group among said first and said second electrode segment groups.

3. A metallized film capacitor in accordance with claim 1 or 2, wherein said first insulating foil film segments are provided with a number of protusions which are protruding in insulating foil film segment thicknesswise directions and are continuously formed parallel to said contact layer at intervals of a predetermined length and at edge portions thereof in contact with said first and said second metal contact layers together with said metal layers.

4. A metallized film capacitor in accordance with claim 1 or 2, wherein said first and said second electrode segment groups are provided with high resistive portions extending along and adjacent and substantially parallel to contacting places with said first and said second metal contact layers.

5. A metallized film capacitor in accordance with claim 1 or 2, wherein said first insulating foil film segments have a compressed stacked shape by a pressing pressure of at least 5 Kg/cm$^2$.

6. A metallized film capacitor in accordance with claim 1 or 2, wherein a width W of overlapping areas of each pair of two confronting metal layers of said first and said second electrode segment groups, and a length L of said metal layers have a relationship that L/W is smaller than 2.0.

7. A metallized film capacitor in accordance with claim 1 or 2, wherein a width W of overlapping areas of each pair of two confronting metal layers of said first and said second electrode segment groups, and a length L' of said first and said second metal contact layers have a relationship that L'/W is smaller than 2.0.

8. A metallized film capacitor in accordance with claim 1 or 2, wherein a distance "d" between said second insulating foil film segments and said first and said second metal contact layers is between 0.1 and 1.0 mm.

9. A metallized film capacitor in accordance with claim 1 or 2, wherein said metal layers on said insulating foil film segments are separated into two groups, and one of said first and said second metal contact layers is separated into two parts, said two parts being respectively in contact with the two separated groups of said metal layers.

10. A process of making a metallized film capacitor comprising the steps of providing a plurality of first insulating foil film segments coated with first and second metal layers on the sides thereof, the first metal layers being formed with the same pattern on first sides of the first insulating foil film segments, and the second metal layers being formed with another same pattern on second sides of the first insulating foil film segments;

providing a plurality of second insulating foil film segments;

assembling a plurality of the first insulating foil film segments with a plurality of the second insulating foil film segments in an alternating stacked fashion; with the first and second metal layers respectively forming first and second electrode segments electrically separated from each other and which are staggered so as to only partially overlap each other providing each of the first and second electrode segments with a first fusing portion extending along and adjacent their edges in the nonoverlapping portions thereof; and forming a first and a second metal contact layer in contact respectively with the first and second electrode segment groups at side edges thereof forming a second fusing portion at said side edges, in the nonoverlapping portions to interconnect the pairs of electrode segments whereby when dielectric breakdown occurs between any respective pairs of electrode segments, at least one of said first and second fusing portions electrically separate to disconnect such pairs of electrode segments from the interconnected pairs of electrode segments.

11. A process in accordance with claim 10, wherein said first fusing portions of the first and second electrode segments are formed by providing the metal layers with portions of reduced thickness and hence higher resistivity.

12. A process in accordance with claim 10, wherein said second insulating foil film segments are provided with a smaller width than the first insulating foil film segments so that their edges overlie the nonoverlapping portions of the first and second electrode segments, and wherein said first fusing portions of the first and second electrode segments are formed by applying a pervious of at least 5 kg/cm$^2$ to the edges of the outermost second insulating foil film segments in the assembled stack.

* * * * *